3,004,011
CATALYTIC PROCESS FOR POLYMERIZING CHLOROPRENE TO A SOLID ELASTOMER

Harold Leonard Jackson, Wilmington, Del., assignor to E. I. du Pont de Nemours and Company, Wilmington, Del., a corporation of Delaware
No Drawing. Filed Feb. 5, 1958, Ser. No. 713,305
4 Claims. (Cl. 260—92.3)

This invention relates to the preparation of polychloroprene and to a new method of polymerizing chloroprene to solid synthetic elastomers of high molecular weight having improved and desirable properties.

The formation of rubber-like polymers from such conjugated diene compounds as butadiene, isoprene, dimethyl butadiene and the like has been accomplished employing a polymerizing agent and selected solvents. Generally, sodium is preferred as a polymerizing agent or catalyst. Numerous modifications of the use of alkali and alkaline earth metals as polymerization catalysts have been disclosed but such disclosures are usually general in nature and teach the use of these catalysts to polymerize dienic hydrocarbons with emphasis on the use of alkali metals.

The polymerization of chloro-2-butadiene-1,3, chloroprene, to solid, elastomeric products presents a different problem from the polymerization of diene hydrocarbons and, generally, many catalysts, such as sodium, that are suitable for one are not suitable for the other. Chloroprene is generally polymerized in aqueous emulsions, in which systems satisfactorily rapid polymerization may be obtained. Polymerization in non-aqueous systems has received relatively little attention. The chief difficulty in utilizing non-aqueous systems for polymerizing chloroprene is the slowness of polymerization, and to date suitable catalysts for polymerizing chloroprene to useful solid elastomeric products in such systems have not been discovered.

Polymerization of chloroprene in non-aqueous systems clearly indicates that conventional catalysts such as sodium or potassium used in diene polymerization, are not suitable in such polymerizations; in fact, those conventional catalysts cited above do not effectively act as catalysts. Effectively catalyzing the polymerization of chloroprene to a solid elastomer having the superior properties noted below in non-aqueous systems has been found to be specific to lithium and lithium incorporated in various alloys is an excellent catalyst for such polymerization.

The problem of improving the properties of polychloroprene at low temperatures has been an outstanding one ever since polychloroprene was first prepared. Although all elastomers become hard and lose their elastic properties at extremely low temperatures, polychloroprene, as now commercialized, becomes hard and loses its elastic properties at a higher temperature than do other elastomers in general. Efforts to overcome the above serious disadvantages of polychloroprene include reaction mixtures leading to the interpolymerization of relatively small amounts of certain other polymerizable compounds with chloroprene. This approach to the problem suffers from the disadvantages of increasing the cost of the raw materials and complicating the manufacturing procedure.

It is an object of the present invention to effect polymerization of chloroprene in non-aqueous systems at accelerated rates.

It is another object of the present invention to effect polymerization of chloroprene using metallic alloys containing lithium.

It is still another object of the present invention to prepare solid elastomeric chloroprene which retains elastomeric properties at low temperatures for extended periods of time.

It is an additional object of the present invention to produce polychloroprene elastomers of high molecular weight which possess marked freeze resistance using a reaction mixture containing a single polymerizable monomer.

The above objects are accomplished in accordance with our invention by subjecting substantially anhydrous liquid chloroprene to the action of metallic alloys containing lithium with or without a nonreacting saturated hydrocarbon solvent.

The polymerization must be carried out in the absence of oxygen, nitrogen or their compounds. Thus, if the polymerization is carried out in a solvent, the latter must contain no alcohol, acid, ketones, amines, etc., as well as being anhydrous and free from dissolved air and carbon dioxide. If a gas phase is present during the polymerization, it must similarly be free of water, nitrogen, oxygen and the like and preferably an inert gas such as helium or argon is employed.

The preparation of polychloroprene in accordance with my invention is thus conveniently carried out in a suitable pressure container enabling the reaction mixture to be strictly controlled out of contact with interfering foreign substances. The pressure container further serves to maintain autogenous pressure although pressure is not particularly critical. Alternatively, the invention may be carried out by passing a suspension of the lithium alloy catalyst in the chloroprene or in its solution in the inert solvent continuously through a reactor maintained at the desired temperature under a pressure which will prevent the formation of any vapor phase.

Although polymerization may be carried out within a temperature range of 0° to 100° C., it is preferred to maintain the temperature between 30° to 70° C., the rate of polymerization increasing with an increase of temperature within the preferred range. Similarly, the degree of polymerization is also affected by the reaction time. In general, the longer the reaction time the larger will be the degree of polymerization and percent of chloroprene polymerized to solid elastomers.

Metallic alloys containing lithium may be employed in the form of chunks or shot. Preferred forms of the alloys are those where the alloys are comminuted in the form of powder or turnings providing some additional surface exposure. Finely divided lithium-containing alloys provide more surface exposure and appear to increase the rate of polymerization, it being understood that the object is to produce chloroprene polymers having the superior properties noted herein and disclosed in co-pending application Serial No. 713,315, filed of even date herewith.

Preferred alloys include those metals of group II–A and group III–A of the periodic system in combination with lithium. The group II–A metals include those metals of atomic number 12–56 such as magnesium, calcium, strontium and barium. The group III–A metals include those having an atomic number less than 55 such as aluminum, gallium and indium.

In the above-referred-to co-filed application, it is stated that an amount of lithium between 0.1 to 1% by weight of the chloroprene in the reaction mixture is preferred within the operative range of 0.05 to 5% by weight of lithium to chloroprene. Using lithium alloys, with lithium as the active catalyst, it has been found that the proportion of metals of groups II–A or III–A to lithium may vary from 199:1 to 5:1 and preferably 19:1 to 8:1 in terms of weight percent using amounts of the alloy to equal between 0.5 to 10% by weight of the chloroprene in the reaction mixture. As indicated in the examples, a range of about 4 to 12% by weight of lithium in the alloys provide excellent results. The differences in concentration of lithium in the reaction mixtures in the instances of pure lithium and lithium alloys may be largely accounted for by variances in surface exposure of the lithium.

The amount of alloy used in the polymerization step may vary widely, but I have found that as a practical matter the alloy should be between 0.5 to 10% by weight of the chloroprene with perhaps the best range being between 1 to 5%.

Stainless steel balls within the pressure vessel in contact with the polymerization mixture have been found suitable for promoting some degree of comminution of the catalysts during polymerization. The reaction mixture can be additionally agitated by means of a shaking machine.

Decreasing the concentration of lithium (by either reducing the amount of lithium in the alloy or decreasing the amount of the alloy itself) within the above-defined limits increases the molecular weight of the elastomers produced. Increasing the concentration of lithium beyond this range in the reaction mixture results in decreasing the molecular weight of the elastomer, although the extreme ranges noted above will still promote the formation of solid chloroprene elastomers.

As previously stated, chloroprene alone can be polymerized in an inert atmosphere in contact with metallic lithium alloys. However, a reaction mixture containing a nonreactive hydrocarbon solvent is usually preferred. The term "nonreactive solvent" includes those solvents that do not interpolymerize with chloroprene, react with the lithium alloys, or otherwise participate irreversibly in the reaction. Cyclohexane is well suited as a solvent as are many other saturated, readily distillable liquid hydrocarbons such as paraffin hydrocarbons, petroleum fractions and the like which do not contain oxygen or nitrogen.

A ratio of solvent to chloroprene of 1:1 is satisfactory, although higher or lower ratios may be used to advantage when results are desired which either approach those obtained in the absence of solvent or are removed from such results. The amount of solvent to be employed with a certain amount of chloroprene may readily be determined by one skilled in the art, depending on the elastomer desired.

Generally, if little or no solvent is included in the reaction mixture, polychloroprene elastomers of higher molecular weight are produced than if the ratio of solvent to chloroprene is 1:1 or more. Frequently, polychloroprene elastomers of high molecular weights are desirable. On the other hand, it may be preferred to prepare solid chloroprene elastomers of lower molecular weight and the addition of solvent to the reaction mixture provides a means of accomplishing that end.

Polymers produced according to the present invention may be cured to products that possess improved freeze resistance. When removed from the reaction container, metallic lithium alloy catalyst residues may be removed by centrifuging if the reaction mixture is sufficiently fluid. The addition of anhydrous thiophene-free benzene will serve to permit centrifuging if the mixture is viscous. The addition of methanol, ethanol or isopropanol will serve to destroy the lithium in the alloy catalyst in the event the mixture is extremely viscous. However, centrifugation or other physical means, such as filtering, of catalyst separation is preferred to the chemical destruction of lithium since the latter step imparts a higher ash content to the polymer.

If solvent is present in the reaction mixture, it may be removed under vacuum subsequent to the destruction and removal of the lithium catalyst. Alternatively, the polymer may be precipitated by the addition of alcohol and thereafter removed and dried by milling.

The use of a lithium alloy as a polymerization agent or catalyst effects the polymerization of chloroprene to elastomers having superior freeze resistance in a reasonable period of time. Reaction time, however, is not critical although several hours, e.g., up to 24, will generally be necessary to insure a satisfactory yield.

The process is suitable for continuous operation. For example, the chloroprene, solvent and finely divided lithium alloy may be continuously passed through a heated tube to produce the desired amount of polymerization and then, after removal of the catalyst, the solvent and unchanged chloroprene may be continuously evaporated from the polymer and recirculated to the polymerizing tube, after replacing the chloroprene which has been used up.

The following examples illustrate various polymerizations which were carried out in stainless steel pressure bombs, in the absence of oxygen, moisture, carbon dioxide and nitrogen.

EXAMPLE 1

A pressure vessel, lined with stainless steel and of 400 ml. capacity, was flushed with argon and then charged with 2.0 g. of a calcium lithium alloy (94/6, by weight) in the form of turnings, 45 ml. of dry cyclohexane, 25 stainless steel balls (⅜" diameter) and 44.5 g. of chloroprene. The chloroprene had been distilled immediately before use and had been passed through silica gel under argon. The reaction vessel was again flushed with argon, closed and agitated at 49–50° C. under autogenous pressure for 12 hours. The reaction vessel was opened and the viscous liquid which it contained was separated from the steel balls and finely divided alloy by filtration under pressure. The clear filtrate was subjected to vacuum distillation. There was obtained as an undistillable residue 12 g. of a rubbery polymer which was soluble in carbon disulfide. Clear, tough, slightly yellow and rubbery films were obtained from the carbon disulfide solution.

The following examples further illustrate the polymerization of chloroprene using alloys of lithium and metals of groups II–A or III–A.

Into a thoroughly dried stainless steel bomb was placed 100 parts by volume of dry chloroprene (redistilled) and 100 parts by volume of solvent [cyclohexane, dried by passing through a silica gel column (35" x 1")] while maintaining a steady flow of helium into the bomb. Twenty-five stainless steel balls were put into the bomb to aid in the comminution of the alloy. The alloy was added after removing the mineral oil in which is was kept by washing with cyclohexane. The bomb was then flushed with helium and securely closed.

The reaction was carried out by placing the bomb in a shaking apparatus and shaking it for the indicated time at the given temperature. The alloy was removed from the reaction mixture by filtering through cheesecloth or paper. Filterable fragments of catalyst were removed by adding methanol. Sufficient methanol was then added to completely coagulate the polymer which was dried under vacuum.

The table below describes pertinent detail of some additional examples.

Table 1

| Ex. | Type of Alloy | Conc. of Alloy, percent | Solvent Ratio | Temp., °C. | Time, Hrs. | Percent Yield | Appearance of Product |
|---|---|---|---|---|---|---|---|
| 2 | Ca/Li(94/6) | 1 | 1-1 cyclohexane | 50 | 16 | 9.2 | polymeric—rubbery. |
| 3 | Ca/Li(94/6) | 1 | do | 65 | 16 | 15.8 | Do. |
| 4 | Al/Li(94/6) | 2 | do | 65 | 16 | 15.6 | Do. |
| 5 | Mg/Li(90/10) | 2 | do | 65 | 16 | 15.1 | soft and rubbery. |
| 6 | Al/Li(94/6) | 2 | do | 85 | 16 | 50.0 | Do. |
| 7 | Ca/Li(94/6) | 0.5 | None | 50 | 16 | 10.2 | polymeric—rubbery. |

I claim:

1. A process for homopolymerizing chloroprene to a solid homopolymeric chloroprene elastomer wherein a liquid substantially anhydrous chloroprene is contacted, at a temperature within the range of 0° to 100° C. with a metallic alloy consisting of lithium and a metal taken from the group consisting of magnesium, calcium, strontium, barium, aluminum, gallium and indium, said alloy containing 4 to 12% by weight of lithium, the total alloy present being within the range of 0.5 to 10% by weight of said chloroprene, said reaction being carried out in a non-reactive non-aqueous system and under inert atmospheric conditions.

2. A process for homopolymerizing chloroprene to a solid homopolymeric chloroprene elastomer wherein a liquid substantially anhydrous chloroprene is contacted, at a temperature within the range of 0° to 100° C. and in the presence of a non-reactive hydrocarbon solvent, with a metallic alloy consisting of lithium and a metal taken from the group consisting of magnesium, calcium, strontium, barium, aluminum, gallium and indium, said alloy containing 4 to 12% by weight of lithium, the total alloy present being within the range of 0.5 to 10% by weight of said chloroprene, said reaction being carried out in a non-reactive non-aqueous system and under inert atmospheric conditions.

3. A process for homopolymerizing chloroprene to a solid homopolymeric chloroprene elastomer wherein a liquid substantially anhydrous chloroprene is contacted, at a temperature within the range of 0° to 100° C., with a metallic alloy consisting of lithium and a metal taken from the group consisting of magnesium, calcium, strontium, barium, aluminum, gallium and indium, said alloy containing 4 to 12% by weight of lithium, the total alloy present being within the range of 1 to 5% by weight of said chloroprene, said reaction being carried out in a non-reactive non-aqueous system and under inert atmospheric conditions.

4. A process for homopolymerizing chloroprene to a solid homopolymeric chloroprene elastomer wherein a liquid substantially anhydrous chloroprene is contacted, at a temperature within the range of 30° to 70° C., with a metallic alloy consisting of lithium and a metal taken from the group consisting of magnesium, calcium, strontium, barium, aluminum, gallium and indium, said alloy containing 4 to 12% by weight of lithium, the total alloy present being within the range of 0.5 to 10% by weight of said chloroprene, said reaction being carried out in a non-reactive non-aqueous system and under inert atmospheric conditions.

References Cited in the file of this patent

UNITED STATES PATENTS

| 1,058,056 | Harries | Apr. 8, 1913 |
| 1,073,116 | Harries | Sept. 16, 1913 |
| 2,665,197 | Rowland | Jan. 5, 1954 |

FOREIGN PATENTS

| 545,193 | Great Britain | May 14, 1942 |

OTHER REFERENCES

Partington: "Textbook of Inorganic Chemistry," Macmillan & Co., London (1953), p. 368.